US011683309B2

(12) United States Patent
Bosch et al.

(10) Patent No.: US 11,683,309 B2
(45) Date of Patent: Jun. 20, 2023

(54) NONCE-BASED ENTERPRISE SECURITY POLICY ENFORCEMENT

(71) Applicant: Cisco Technology, Inc., San Jose, CA (US)

(72) Inventors: Hendrikus GP Bosch, Aalsmeer (NL); Jeffrey Michael Napper, Delft (NL); Alessandro Duminuco, Milan (IT); Sape Jurrien Mullender, Amsterdam (NL); Julien Barbot, Villebon-sur-Yvette (FR); Vinny Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 17/169,086

(22) Filed: Feb. 5, 2021

(65) Prior Publication Data

US 2022/0255937 A1    Aug. 11, 2022

(51) Int. Cl.
*H04L 9/40* (2022.01)
*H04L 61/4511* (2022.01)

(52) U.S. Cl.
CPC .......... *H04L 63/10* (2013.01); *H04L 61/4511* (2022.05); *H04L 63/0876* (2013.01); *H04L 63/20* (2013.01); *H04L 63/0272* (2013.01)

(58) Field of Classification Search
CPC . H04L 63/10; H04L 61/4511; H04L 63/0876; H04L 63/20; H04L 63/0272; H04L 2101/604; H04L 2101/659; H04L 63/0281; H04L 63/102; H04L 63/1425
USPC .......................................................... 726/4
See application file for complete search history.

(56) References Cited

U.S. PATENT DOCUMENTS

| 7,620,733 | B1 | 11/2009 | Tzakikario et al. |
| 2013/0212249 | A1 | 8/2013 | Groat et al. |
| 2019/0036871 | A1 | 1/2019 | Lapidous et al. |
| 2020/0007585 | A1 | 1/2020 | Williams |

(Continued)

FOREIGN PATENT DOCUMENTS

WO    WO2020229707 A1    11/2020

OTHER PUBLICATIONS

Roberts, et al. "Watching the Watchers: Nonce-based Inverse Surveillance to Remotely Detect Monitoring" published Jun. 5, 2020, arXiv:2005.07641v2, 9 pages.

(Continued)

*Primary Examiner* — Kambiz Zand
*Assistant Examiner* — Aubrey H Wyszynski
(74) *Attorney, Agent, or Firm* — Lee & Hayes, P.C.

(57) ABSTRACT

This disclosure describes techniques including, by a domain name service (DNS), receiving a name resolution request from a client computing device and, by the DNS, providing a nonce to the client computing device, wherein a service is configured to authorize a connection request from the client computing device based at least in part on processing the nonce. This disclosure further describes techniques include a method of validating a connection request from a client computing device, including receiving the connection request, the connection request including a nonce. The techniques further include determining that the nonce is a valid nonce. The techniques further include, based at least in part on determining that the nonce is a valid nonce, authorizing the connection request and disabling the nonce.

19 Claims, 6 Drawing Sheets

(56) References Cited

U.S. PATENT DOCUMENTS

| | | |
|---|---|---|
| 2020/0067954 A1 | 2/2020 | Plonka et al. |
| 2020/0162431 A1* | 5/2020 | Goldschlag ......... H04L 61/4511 |
| 2020/0322386 A1 | 10/2020 | Mani et al. |
| 2021/0195409 A1* | 6/2021 | Zhang .................... H04L 12/14 |

OTHER PUBLICATIONS

The International Search Report and Written Opinion for PCT Application No. PCT/US22/13343, dated Apr. 25, 2022, 14 pages.

\* cited by examiner

NONCE-BASED ENTERPRISE SECURITY POLICY ENFORCEMENT

TECHNICAL FIELD

The present disclosure relates generally to network security policy enforcement and, more specifically, to nonce-based network security policy enforcement by a domain name service.

BACKGROUND

Dynamic policy-based routing (DPBR) is a technique whereby an enterprise can dictate, on a per server-application basis, how to manage traffic flows directed to that application from client computing devices. For example, an enterprise worker may start a browser or local application on a mobile client computing device to connect to, say, abc123.com. As a result, the mobile client computing device may make a domain name service (DNS) request to resolve the abc123.com domain to an address, such as to translate the abc123.com domain name to an internet protocol (IP) address that the mobile client computing device can use to route traffic flows to the abc123.com domain.

However, the enterprise whose network to which the mobile client computing device is connected may wish to regulate such flows by, for example, capturing DNS requests in a security appliance or cloud. In some examples, the enterprise may install a policy in a client agent to cause the client agent to capture and regulate flows to abc123.com. For example, the client agent may capture the DNS request by snooping UDP port 53 and, when abc123.com is resolved and when policy dictates traffic to abc123.com is to be captured, the enterprise may install a rule or even a route in the client kernel that directs, to the agent, all flows to the IP address associated with abc123.com so that the agent can apply security policy rules or other policy rules to the flows. The enterprise may dynamically configure the client agent by, for example, downloading new or updated policy rules into the client agent.

The DNS server receives requests over an unauthenticated UDP channel and, therefore, does not have the option to verify the identity of the requesting client. The DNS server, even if it is an enterprise server serving an enterprise client, cannot supply bespoke directions to (through) an enterprise firewall if that is appropriate for the specific client/server combination. Furthermore, the responses from the enterprise DNS server can be cached by the client and a client could even find the address of a server by some other means, which could allow the client to bypass any firewall to which the DNS server may otherwise be configured to send traffic.

A solution using a client agent to enforce security policy rules may be brittle. For example, such a solution may rely on the client agent to examine all DNS traffic that is sent over User Datagram Protocol (UDP) port 53. Therefore, the DNS traffic is sent over UDP port 53 in the clear so that it can be examined by the client agent. In the example of abc123.com just discussed, the client agent captures the DNS request for abc123.com sent over UDP port 53, forwards the DNS request into the Internet for name resolution, and then the client agent maps the received fully-qualified domain name (FQDN) onto an enterprise policy that is maintained by the client agent. When there is a match of the FQDN to the enterprise policy, the client agent updates the network stack to redirect a flow that would otherwise go to a particular IP address to instead go to the client agent. This strategy is suboptimal for a variety of reasons.

DNS-over-HTTPS (DoH) and DNS-over-TLS (DoT) can provide end-to-end encryption between a client computing device requesting a translation and the DNS service itself. As a result, the DNS request may not be in the clear, and the client agent may not be able to easily examine the FQDN (though, a complicated implementation may hairpin DNS traffic from a DoH/DoT service back to the client computing device). The DNS server can be in a position here to know the identity of the client and thus provide bespoke responses to clients. But what DoT or DoH does not solve is that the client can still use external knowledge to learn the address of a server by some other methods and still communicate with the server directly, bypassing the enterprise security infrastructure. Moreover, DNS responses are cached, and clients may not abide by the best-before date given by the DNS server.

Furthermore, if a web-service is multihomed, such as a load balancer providing an interface to multiple websites hosted behind the load balancer, it may be difficult for the client agent to segregate the domains of the multiple websites. For example, if both abc123.com and 123abc.com are hosted by one ore more load balancers, either both abc123.com and 123abc.com are directed to the client agent or neither are directed to the client agent, because their names abc123.com and 123abc.com resolve to the same IP address—the IP address of the load balancer between abc123.com and 123abc.com.

Moreover, with the client agent approach, applications of enterprise policies is distributed among the various client agents in client computing devices connected to the network. Thus, all client agents are told of the DPBR policy and the "policy files" are downloaded or made accessible from the web. When an enterprise enacts updated policies, there may be a time lag to implement the updated policies as the updated policies are distributed to the various client agents, even if it is desirable for the updated policies to take effect immediately.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for nonce-based network security policy enforcement by a DNS, such as a DNS that is part of an enterprise infrastructure and that cooperates with the enterprise security-policy enforcement to provide specific responses to clients that help the enterprise enforce security measures.

The techniques include, by the DNS, receiving a name resolution request from a client computing device and, by the DNS, providing a nonce to the client computing device, wherein a service is configured to authorize a connection request from the client computing device based at least in part on processing the nonce. For example, the DNS may provide the nonce to the client computing device in the form of a nonce address.

The techniques further include a method of validating a connection request from a client computing device, including receiving the connection request, the connection request including a nonce. The techniques further include determining that the nonce is a valid nonce. The techniques further include, based at least in part on determining that the nonce is a valid nonce, authorizing the connection request and disabling the nonce.

Additionally, the techniques described herein may be performed by a system and/or device having non-transitory computer-readable media storing computer-executable instructions that, when executed by one or more processors, performs the methods described herein.

Example Embodiments

In some examples, for dynamic policy-based routing, a client agent such as a virtual private network (VPN) client agent executing on a client computing device selects traffic to be captured, to apply security policies, by matching service name indications in client DNS requests to a list of policies that have been provided to that client agent from a central authority. Based on a match being found, the client agent may reprogram the network stack of the client computing device to direct the traffic to itself. The client agent tunnels such redirected traffic to a security function. Traffic not so redirected, because the service name indication in a DNS request from the client computing device for the traffic does not match one of the policies provided from the central authority, is allowed to be routed directly from the client computing device to the named service. This approach based on client agents may have several disadvantages, including that policy decisions in the operating network are highly decentralized.

In some techniques described herein, such policy decisions may be made in association with a DNS request made by a client computing device. The DNS service, or a service associated with the DNS service, may determine a security policy, if any, to apply to the flow with which the DNS request is associated based at least in part on the indication of a protected service in the DNS request. Based on the security policy, the DNS service, or a service associated with the DNS service, may provide a nonce to the client computing device in response to the DNS request. The client computing device may include the nonce in a connection request to a service, and the service evaluating the connection request may process the nonce to determine what policies to apply to the connection request. Further, the nonce may be an address that points to, for example, a firewall that uses the nonce portion of the address to look up where to forward the traffic (e.g., looks up a server to which the traffic is to be forwarded after inspection). Furthermore, the nonce may thereafter disabled so that it cannot be reused, such as by a device that is able to snoop on the DNS request/response traffic. "Nonce" is a term generally familiar to security specialists, but perhaps not to information technology specialists. "Nonce" was used in the information technology context by Roger Needham, who explained that a "nonce" may be a token added to a message that will be later retuned in a response message, thus proving that the response was generated (partly) by that message. A nonce is generally unguessable and only used once.

Techniques disclosed herein can include capturing traffic in a security function from a computing device, such as a mobile computing device. For example, a DNS server may work together with an enterprise security system and provide addresses that will direct a client's traffic through the system in a secure manner. Those addresses may have a "nonce portion" that makes them unique and usable only once. Moreover, the nonce portion may assist components downstream to identify the traffic for further routing towards where it needs to go.

The DNS response may lead to at least four different types of connections from the client computing device: With a first type, the response allows the client computing device to contact the server directly, every time. In this case, the DNS server may just give the client computing device the server's regular address (no nonces involved). With a second type, the DNS server may allow the client computing device to correspond directly with the server—but only one time. The DNS server may coordinate with the server and agree on a nonce address that the server will accept from the client computing device this time only. For a new conversation, the nonce address will no longer work. With a third type, the DNS server wants the traffic from the client computing device to be routed through the enterprise security infrastructure. The DNS server agrees on a nonce address with the security infrastructure and gives that agreed-upon address to the client computing device. The client computing device uses the address to connect to the security infrastructure, and the security infrastructure that knows about the address will also know how to forward the traffic to the intended server. Because the client computing device sends its traffic using an encrypted tunnel anyway, further encapsulation in a VPN may not be necessary. With a fourth type, most client-server traffic is carried in authenticated and encrypted TLS connections. In those rare occasions where it is not protected automatically, the security infrastructure may wish the traffic to be sent through a VPN tunnel. To use the fourth type in in combination with one or more of the other three options, the client computing device may have a component (client agent) that can intercept the traffic to go through the VPN and send it through that VPN, segregating that VPN traffic from the traffic according to the first type, the second type and the third type.

Thus, for example, a client agent such as a VPN client agent may not be necessary for applying policy-based dynamic routing. The techniques may enable an enterprise to control and direct the capture of traffic from a client computing device, such as a mobile client computing device used by an enterprise worker, without direct involvement of that worker.

For dynamic policy-based routing, in many examples, a client agent selects what traffic to capture by matching client DNS requests to a list of policies that are downloaded into that agent. Depending on whether a match is found, the agent may reprogram the network stack to direct that traffic to itself. The agent may then tunnel the traffic to a security function. Alternatively, traffic can be allowed to be routed directly to the named service.

The DNS server (part of the enterprise) should securely know the identity of the client computing device. Unencrypted port 53 traffic does not allow that, because it could be generated anywhere and intercepted by anyone. So, for example, DoH or DoT may be used, with the DNS server verifying the identity of the client computing device before responding to requests. Alternatively, a DNS server that cannot verify the identity of a client computing device may direct all of the client computing device's traffic through the corporate security infrastructure. A method to capture traffic may rely on combining a central DNS server capable of capturing end-to-end encrypted traffic, that is integrated with a central enterprise policy service and, optionally, one or more centrally hosted destination services. In accordance with some described techniques, when a client computing device requests name resolution from the DNS service, the DNS service, sometimes in collaboration with an enterprise policy manager, may determine how traffic from the client computing device is to be routed (such as directly, or via an enterprise security function). The DNS service may set up the security function, if necessary, and then send a short-lived address—a nonce address—in a DNS response. The nonce address may allow the client computing device, and only the client computing device, to reach the service, possibly via the security function, for a limited time.

Thus, for example, flows may be captured that are to be regulated by a security function. The DNS request may be recognized by a security function, and then if a flow is to be captured, the requested name may be mapped to a dynamically allocated IP address from a destination function and a route installed in the client computing device that points to the destination function, optionally by way of a secured tunnel. This can simplify the processing by the client computing device and provide a robust and flexible solution.

More specifically, a network-based function may work in concert with a network-based DNS, posture- and policy service, zero, one or more (in-line) security services and an optional client agent to tunnel traffic to the security functions. A technique may include capturing a client computing device's DNS request for the server in the central network function. The identity of the client computing device may also be captured. By policy, it may be determined if the flows to that server, perhaps from the specific client or from client similarly characterized, are to be captured by a security function. If the policy service indicates flows do not need to be captured, the DNS may return the public IP address of the requested server in its response, to allow the client computing device to directly engage with the server across the Internet.

When flows are to be captured, the DNS may return an address that routes to an enterprise security function, possibly via a protective tunnel, where the traffic can be inspected before forwarding to the server. Alternatively, or additionally, an address can be returned that a virtual private cloud ingress point, load balancer or other multihomed service can use to deliver traffic to the desired service. This may free the ingress point from having to interpret service names.

The DNS server for an enterprise device may be an enterprise DNS server that uses an enterprise policy or interacts with an enterprise policy server to provide the DNS response. The DNS request and DNS response may be end-to-end encrypted, to minimize the possibility of tamper, such as by DoH or by DoT. The client computing device identity may be captured by the DNS server, allowing the use of user- or client-specific policies (or, in some examples, policies specific for categories of clients). Using enterprise policy (possibly client-specific), the DNS server can determine how traffic between client and (cloud) server should be treated and respond appropriately.

When the client is to be allowed to communicate to the server directly, the DNS server may simply return the IP address of that server. Alternatively, for sensitive enterprise servers that should only be addressed by authorized clients, the DNS server may return a nonce address to those requesting authorized clients. The DNS server can also return a nonce address that indicates an enterprise security function, or routes through a virtual private cloud (VPC) ingress point or load balancer. After passing through that function, traffic may be forwarded to the requested server. That routing may use a tunnel between the client and the security function. In that case, the nonce address may not be a routable address (preventing it from being used outside the tunnel). The DNS server and the security function may have previously agreed on these nonce addresses, so that the security function can recognize the address for security and server-forwarding purposes. The nonce address can be client specific. It may be used as a one-time permission for that client to access the service. As soon as a client has started using the nonce address, the nonce address may be disabled so that other clients are no longer able to connect using that same address.

A nonce address may be an address used for a specific purpose and valid for a limited time. A name server can map a name to a nonce address that can only be used by a specific client and only once. Or a name server can map to a nonce address that can be used by multiple clients in a particular category and for a period of, for example, five minutes. A nonce address may not be guessed. Without the assistance of the name server, a useful nonce address cannot be obtained.

IPv6 addresses may be suited to be used as nonce address. The size of an IPv6 address being 128 bits allows only half of those bits to be used to route packets to their destination—the routing part. The other half may be available to identify a service, and/or a purpose, at that destination—the nonce part. That purpose may be, for example, the connection of a particular authorized client to the service. Or it may be the connection of clients via some security functions to the service. Nonce addresses in this latter category can be devised not to work for direct connections. A nonce address intended for routing traffic through a network-based security function can be made to route to that security function only, while the nonce part can be used by the security function to look up what security functions should be provided and where the traffic should be forwarded subsequently. Nonce addresses can also be used to tell an intermediate function, such as a load balancer, how to forward traffic to the correct service in, for example, a VPC.

If nonce addresses are used to address a service directly, then some coordination may be employed between the DNS server giving them out and the service being addressed. Alternatively, the nonce address can be used to reach a gateway that forwards the traffic to the correct service. In this latter case, in some examples, only the gateway may be involved with nonce-address assignment and interpretation.

This coordination can be explicit—that is, the service (or gateway) and the DNS server may exchange information to accomplish the coordination—or the coordination may be implicit, by using an algorithm shared by the service and the DNS server. An example of such an algorithm can be that the two entities share a key and an initial address to be given out. They can each independently calculate the next address by applying a function with the shared key and the previous address as inputs. This function may not have to be cryptographically strong—real verification is still carried out in the TLS handshake and subsequent client authentication. Instead, the function may be carried out relatively inexpensively and can also thus be resistant to distributed denial of service (DDoS) attacks.

If, on the other hand, nonce addresses are used to direct clients through a security function before forwarding traffic to the destination service, then more explicit agreement between the security function and the DNS server may be carried out. The DNS server, as the manager of the enterprise security profile, may identify what security requirements are to be used for a specific client-server connection. The DNS server may set this up in the security-function infrastructure and set up the nonce address to be used for that connection. The DNS server may then return the DNS resolution to the requesting client to include that same nonce address.

Flow can therefore be captured in a security function (e.g., cloud) as a side-effect of resolving the name of the (cloud) application through a centralized DNS service. This DNS service can be part of a cloud-based security function. The DNS service may provide nonce-addresses with the benefit of ensuring that the addresses are valid for a specific purpose and possibly for only a specific client, allowing the addresses to double as directives for a security function as to how to treat and forward the traffic, and limiting the lifetime of the addresses, so caching of addresses may be better controlled. A client route may be configured on a client computing device that directs flows to a pre-established tunnel and DNS resolving names of cloud applications that point to the IP address space associated with that tunnel.

Figure 1:
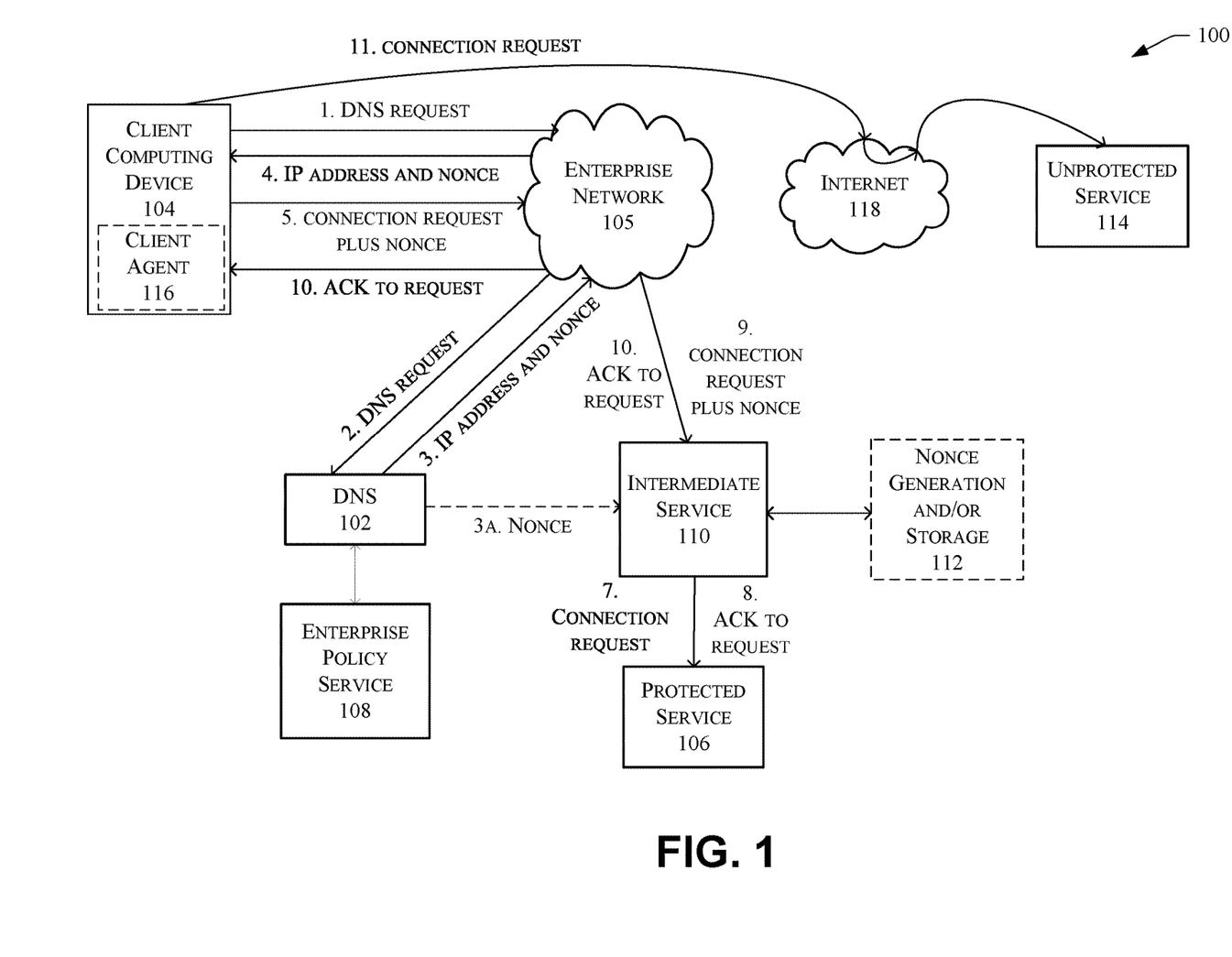
FIG. 1 is an architecture diagram illustrating an example network in which a DNS service may determine a security policy is to be applied to a flow with which a DNS request made by a client computing device via an enterprise network is associated, based at least in part on an indication of a protected service in the DNS request.

FIG. 1 is an architecture diagram illustrating an example network 100 in which a DNS service 102 may determine a security policy is to be applied to a flow with which a DNS request made by a client computing device 104 via an enterprise network 105 is associated, based at least in part on the indication of a protected service 106 in the DNS request. For example, the DNS service 102 may refer to an enterprise policy service 108 to determine a security policy is to be applied to the flow with which the DNS request made by the client computing device 104 via the enterprise network 105 is associated, based at least in part on the indication of the protected service 106 in the DNS request.

The DNS service 102 may respond to the DNS request made by the client computing device 104 with an indication that the security policy is to be applied to the flow with which the DNS request made by the client computing device 104 is associated. For example, the DNS service 102 may resolve a domain name in the DNS request to an address associated with an intermediate service 110. The intermediate service 110 may be a security service or other service that operates to function as a gateway to the protected service 106.

In addition, the DNS service 102 may respond to the DNS request made by the client computing device 104 with a nonce. A nonce is an arbitrary number that can be used just once for communication. A nonce is often a random or pseudorandom number issued in an authentication protocol to ensure that old communications cannot be reused in replay attacks. In the context of the network 100, the nonce may be a number that is processed by the intermediate service 110 in determining to authorize a connection request from the client computing device 104 to the protected service 106. That is, the client computing device 104 includes the nonce, received from the DNS service 102 as part of the response by the DNS service 102 to a DNS request, in the connection request to the protected service 106 based at least in part on processing the nonce. The intermediate service 110 validates the connection request from the client computing device 104 to the protected service 106 by, at least in part, determining if the nonce is a nonce that corresponds to a valid connection request by the client computing device 104 to the protected service 106.

In one example, based at least in part on the DNS request from the client computing device 104, the DNS service 102 may provide the nonce to both the client computing device 104 as at least a part of the response to the DNS request from the client computing device 104, as well as providing the nonce to the intermediate service 110. The intermediate service 110 may then use the nonce provided by the DNS service 102 to validate the connection request from the client computing device 104 to the protected service 106 by in part, for example, comparing the nonce provided by the DNS service 102 to the nonce provided by the client computing device 104 as part of the connection request from the client computing device 104 to the protected service 106.

In another example, based at least in part on the DNS request from the client computing device 104, the DNS service 102 may provide the nonce to the client computing device 104 as at least part of the response to the DNS request from the client computing device 104, but does not provide the nonce to the intermediate service 110. The DNS service 102 and the intermediate service 110 may coordinate to agree on the nonce. This coordination can be explicit. For example, the DNS service 102 and the intermediate service 110 may exchange information to coordinate to agree on the nonce. As another example, the coordinate can be implicit, such as by using an algorithm commonly known by both the DNS service 102 and the intermediate service 110. An example of such an algorithm includes the DNS service 102 and the intermediate service 110 agreeing on a key and an initial nonce. The DNS service 102 and the intermediate service each independently calculate, using the commonly known algorithm, the next nonce by applying a function with the shared (secret) key and the previous nonce as inputs. For example, the intermediate service 110 may have an associated nonce generation and/or storage function 112 The function may not be cryptographically strong. For example, verification may still be carried out in a transport layer security (TLS) handshake and subsequent client authentication.

In some example, the nonce may utilized by the intermediate service 110, such as a security service, to determine what policies to apply to traffic from the client computing device 104 destined to the protected service 106. For example, there may be more explicit agreement between the DNS service 102 and the intermediate service 110. For example, the DNS service 102, as manager of the enterprise security profile, may identify what security requirements are to be applied for the connection between the client computing device 104 and the protected service 106. The DNS service 102 may provide an indication of the security requirements to the intermediate service 110 along with the nonce. When the client computing device 104 provides, to the intermediate service 110, the connection request to the protected service 106, the intermediate service 110 may process the nonce received in the connection request to determine what security policies to apply to the connection between the client computing device 104 and the protected service 106.

In another example, the DNS service 102 may determine that a security policy is not to be applied to a flow with which a DNS request made by a client computing device 104 via the enterprise network 105 is associated, based at least in part on the indication of an unprotected service 114 in the DNS request. For example, the DNS service 102 may refer to the enterprise policy service 108 to determine that a security policy is not to be applied to the flow with which the DNS request made by the client computing device 104 via the enterprise network 105 is associated, based at least in part on the indication of the unprotected service 114 in the DNS request.

In this example, the DNS service 102 may resolve a domain name in the DNS request to an address associated with the unprotected service 114. The DNS service 102 may provide, to the client computing device 104, the address associated with the unprotected service 114. The DNS service 102 may not provide, to the client computing device 104, a nonce for the client computing device to provide to as part of the connection request from the client computing device 104 to the unprotected service 114. For example, since a security policy is not to be applied to a flow to the unprotected service 114, the nonce may not be required to be provided by the client computing device 104 making a connection request to initiate a connection to the unprotected service 114.

In some examples, the client computing device 104 may still include a client agent 116 that regulates access to at least some protected services. In some examples, the enterprise may install a policy in the client agent 116 to cause the client agent 116 to capture flows to the at least some protected services. The enterprise may dynamically configure the client agent 116 by, for example, downloading new or updated policy rules into the client agent 116.

In a specific example of use of the example network 100, the client computing device 104 issues a DNS request (1) via the enterprise network 105. The DNS request includes the domain name of the protected service 106, to be resolved by the DNS service 102 into an IP address. The DNS request may be formatted and defined, for example, in accordance with RFC 1035, "Domain Names—Implementation and Specification," dated November 1987. The DNS request continues on (2), via the enterprise network 105, to the DNS service 102.

The connection between the client computing device 104 and the DNS service 102 may be a secure end-to-end encrypted connection. For example, the secure end-to-end connection may be a DoH connection in accordance with RFC 8484, "DNS Queries over HTTPS (DoH)," dated October 2018. DoH is a protocol for sending DNS queries and getting DNS responses over HTTPS. In accordance with DoH, each DNS query-response pair is mapped into an HTTP exchange. DoH establishes default media formatting types for requests and responses using normal HTTP content negotiation mechanisms for selecting alternatives that endpoints may prefer. DoH also aligns itself with HTTP features such as caching, redirection, proxying, authentication, and compression. The integration with HTTP provides a transport suitable for both existing DNS clients and native web applications seeking access to the DNS.

As another example, the connection between the client computing device 104 and the DNS service 102 may be a secure end-to-end encrypted connection that is a DoT connection in accordance with RFC 7858, "Specification for DNS over Transport Layer Security (TLS)," dated May 2016. DoT uses DNS over TLS on a well-known port. By establishing a connection over a well-known port, clients and servers expect and agree to negotiate a TLS session to secure the channel.

The DNS service 102 forms a DNS response that includes the IP address corresponding to the intermediate service 110 and a nonce for use by the client computing device 104 to include as part of a connection request to the protected service 106. The DNS service 102 may form a response that is formatted and defined in accordance with RFC 1035. The DNS service provides (3) the DNS response, which is provided (4) to the client computing device 104 via the enterprise network 105.

In some examples, the DNS service 102 also provides (3a) the nonce to the intermediate service 110. In other examples, the intermediate service 110 independently generates the nonce, having coordinated with the DNS service 102 so that the nonce that the intermediate service 110 independently generates corresponds to the nonce that the DNS service 102 includes in the DNS response that goes to the client computing device 104.

In some examples, the DNS service 102 includes the nonce as part of the address, such as an IP address, that the DNS service 102 provides to the client computing device 104. For example, the IP address may be an IPv6 address formatted in accordance with RFC 4291, "IP Version 6 Addressing Architecture," dated February 2006. The DNS service 102 may include the nonce as the lower 64 bits of the IPv6 address, whereas the upper 64 bits of the IPv6 address may be utilized by the network 100 for routing.

The client computing device 104 includes (5) the nonce as part of a connection request to the protected service 106, which is provided (6) via the enterprise network 105. The destination address that the client computing device 104 includes in the connection request is the address of the intermediate service 110. This is due to the DNS service 102 having provided the address of the intermediate service 100 to the client computing device 104 in response to the DNS request made by the client computing device 104 to resolve the name of the protected service 106.

The intermediate service 110 receives the nonce as part of the connection request by the client computing device 104 to connect to the protected service 106. The intermediate service 110 evaluates the nonce received as part of the connection request to determine whether to allow the connection request to the protected service 106. For example, the intermediate service 110 may compare or otherwise evaluate the nonce received as part of the connection request relative to a nonce the intermediate service 102 received from the DNS service 102 based at least in part on the DNS request provided from the client computing device 104 to resolve the name of the protected service 106. As another example, the intermediate service 110 may compare or otherwise evaluate the nonce received as part of the connection request relative to a nonce the intermediate service 110 independently generated or is generated by an associated nonce generation service 112. As part of the evaluation of the received nonce, the intermediate service 110 may evaluate whether the received nonce had been previously used and, thus, would be invalid to be used subsequent to the initial use of the nonce. For example, the intermediate service 110 may keep a record of previously used nonces, and the intermediate service 110 may compare the received nonce to its record of previously used nonces.

When the intermediate service 110 determines the nonce received from the client computing device 104 as part of a connection request to the protected service 106 indicates the connection request is a valid connection request, the intermediate service 110 provides (7) the connection request to the protected service 106. The protected service 106 responds (8) to the connection request, such as at least providing an acknowledgement of the connection request to the intermediate service 110. The intermediate service then provides (9) a response, which may include the acknowledgement, via the enterprise network 105 to be provided (10) to the client computing device 104. The client computing device 104, having received the response, connects to the protected service 106, such as to initiate a flow of data traffic to the protected service 106.

In another example, the DNS request the client computing device 104 provides (1), which is provided (2) to the DNS service 102 via the enterprise network 105, is a DNS request to resolve the name of the unprotected service 114. The DNS service 102 provides (not shown in FIG. 1) a response, to the client computing device 104 via the enterprise network, that resolves the name of the unprotected service 114 to the address of the unprotected service 114. The client computing device 104 thereafter provides (11) a connection request to the unprotected service 114 via the internet 118. The unprotected service 114 acknowledges the connection request to the client computing device 104, which thereafter connects to the unprotected service 114, such as to initiate a flow of data traffic to the unprotected service 114.

Figure 2:
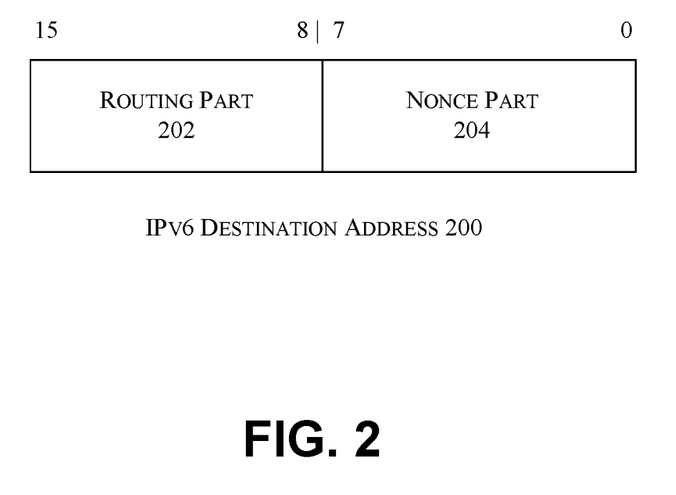
FIG. 2 illustrates an example format for an IPv6 destination address provided by a DNS service, the format including a routing part and a nonce part.

In some examples, in responding to the DNS request provided from the client computing device 104, the DNS service 102 includes the nonce as part of an IPv6 destination address that the DNS service 102 provides, corresponding to the intermediate service 110. FIG. 2 illustrates an example format 200 for such an IPv6 destination address that includes the nonce. Referring to FIG. 2, the example format 200 includes a routing part 202 and a nonce part 204.

The routing part 202 includes the most significant eight octets (octets 8 to 15) of the example format 200. The eight-octet routing part 202 of the IPv6 format 200 is sufficient to be used to route packets from the client computing device 104 to the intermediate service 110. The nonce part 204 includes the least significant eight octets (octets 0 to 7) of the example format 200. The eight-octet nonce part 204 of the IPv6 format 200 are determined by the DNS service 102 and used by the client computing device 104 to identify a service and/or a purpose to the intermediate service 110 in the connection request. For example, the eight-octet nonce part 204 of the IPv6 format 200 may identify a purpose to connect the client computing device 104 to the protected service 106. As another example, the intermediate service 110 may be a security service, and the eight-octet nonce part 204 of the IPv6 format 200 may identify security functions for the intermediate service 110 to apply to traffic originating at the client computing device 104 and destined to the protected service 106.

The DNS service 102 may generate the routing portion 202 of the IP address format to avoid direct connection to the protected service 106. For example, the DNS service 102 may generate the routing portion 202 of the IP address format 200 for a connection intended to be regulated by a network-based security function, such as the intermediate service 110 performing the security function, to route traffic to that security function only and not to the protected service 106 as the initial destination. The security function may process the nonce part 204 of the IP address format 200 to determine what security functions to perform and the destination service to which to forward the traffic (e.g., the protected service 106) after performing the security functions.

In other examples, the intermediate service 110 may be performing other types of functions in addition to or instead of performing security functions. For example, the intermediate service 110 may be performing a load balancing function. In this example, the intermediate service may process the nonce part 204 of the IP address format 200 to determine how to forward traffic to the appropriate service in, for example, a virtual private cloud (VPC) that includes multiple services.

Figure 3:
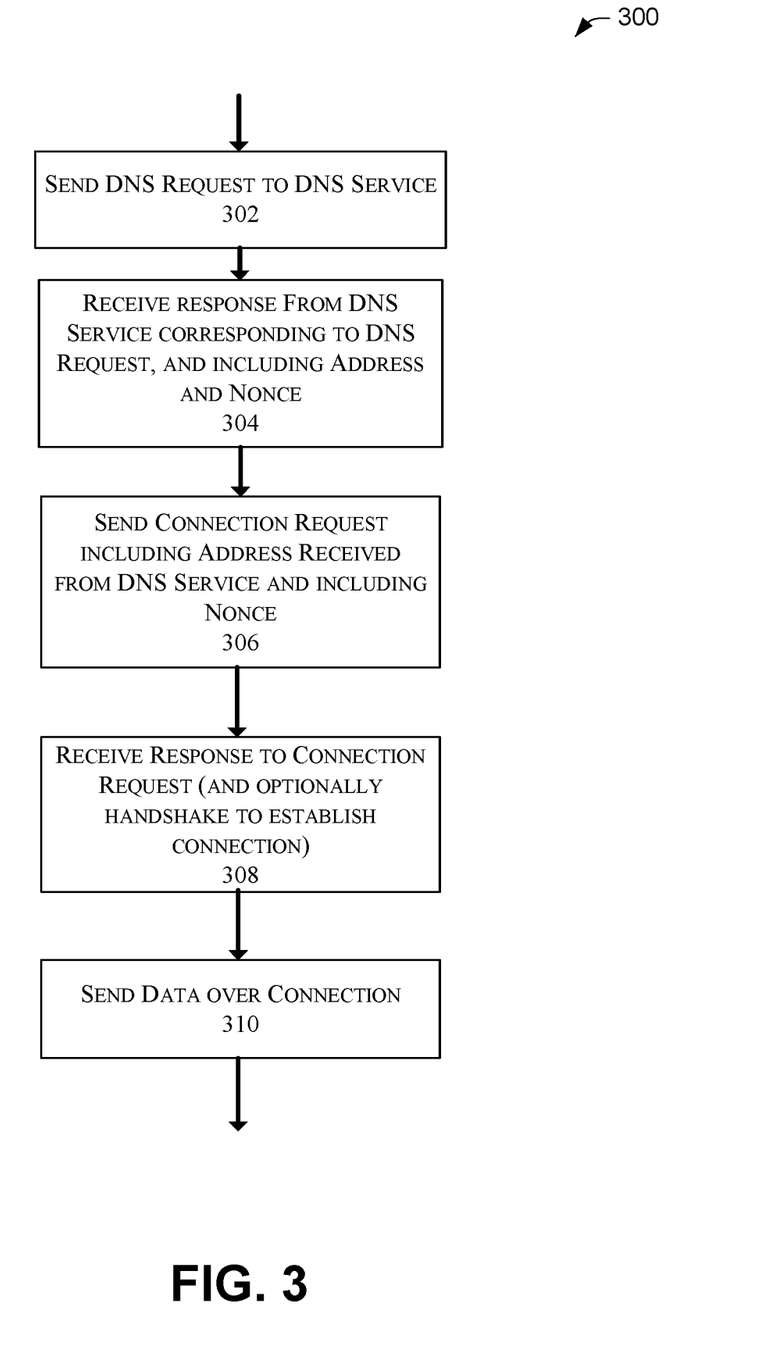
FIG. 3 is a flowchart illustrating an example process carried out by a client computing device, to initiate and carry out a connection with a protected service including by providing a connection request including a nonce provided by a DNS service.

FIG. 3 is a flowchart illustrating an example process 300 carried out by the client computing device 104, to initiate and carry out a connection with the protected service 106. For example, the protected service 106 may be protected by enterprise security functions performed by the intermediate service 110.

At 302, the client computing device 104 makes a DNS request to the DNS service. The client computing device 104 makes the DNS request to the DNS service 102, with the client computing device 104 including the domain name of the protected service 106 in the DNS request. At 304, the client computing device 104 receives a response, corresponding to the DNS request, from the DNS service 102. The response includes, in one example, an IPv6 address that includes both a routing part and a nonce part.

In other examples, the client computing device 104 receives a response in which the nonce is not part of the received address but, rather, is an adjunct to the received address. That is, in these other examples, the client computing device 104 will not include the nonce as part of the destination address when the client computing device 104 provides a connection request to the protected service 106, but the nonce may be included in a different field of the response to the DNS request other than the received address.

At 306, the client computing device 104 provides the connection request, including the address (and the nonce separately, if the DNS service 102 did not provide the nonce as part of the address) received from the DNS service 102. Due at least in part to the address provided by the DNS service 102 pointing to the intermediate service 110, the connection request is routed to the intermediate service 110.

At 308, the client computing device 104 receives a response to the connection request that the client computing device 104 provided. In some examples, the client computing device 104 participates in a handshake exchange of messages to establish the connection with the protected service 106. At 310, the client computing device 104 sends data traffic over the thus-established connection.

With respect to the process 300, in some examples due to the DNS service 102 embedding the nonce in the IP address it provides, the client computing device 104 may not even be aware that the response from the DNS service 102 includes the nonce. Furthermore, when the client computing device 104 sends the connection request and includes the IP address, with embedded nonce, that was provided from the DNS service 102, the client computing device 104 may not even be aware that the IP address includes the nonce. Yet further, for example, when the client computing device 104 sends traffic destined to the protected service 106 over a connection, the client computing device 104 may not even be aware that the routing part 202 of the IP address is used to route the traffic to the address of the intermediate service 110 and that the nonce is included as a nonce part 204 of the IP address.

Figure 4:
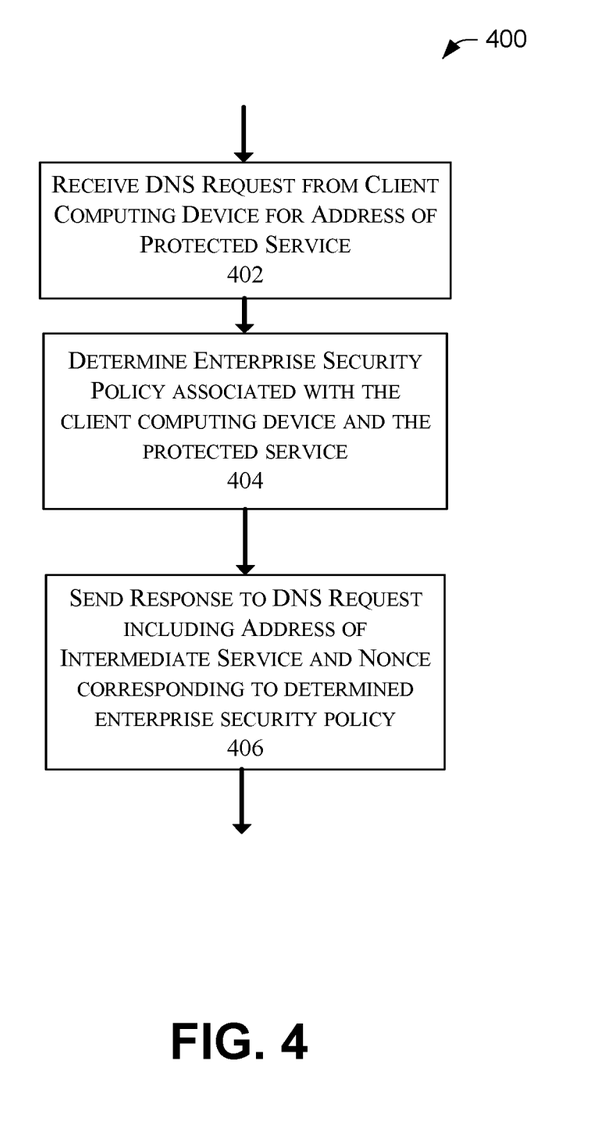
FIG. 4 is a flowchart illustrating an example process carried out by a DNS service to resolve a request from the client computing device for an address of a protected service, the response including a nonce.

FIG. 4 is a flowchart illustrating an example process 400 carried out by the DNS service 102 to resolve a request from the client computing device 104 for an address of the protected service 106. At 402, the DNS service 102 receives a DNS request from the client computing device 104. The DNS request includes an indication of the domain name of the protected service 106.

At 404, the DNS service 102 determines at least one enterprise security policy associated with the client computing device 104 and the protected service 106. For example, a network administrator may have used a network management platform and/or portal to configure the enterprise security policies. In some examples, the network administrator using a network management platform and/or portal in this way may not be much different, if at all, from using the network management platform and/or portal to configure enterprise security policies for download into the client agent 116 that may be executed by the client computing device 104.

At 406, the DNS service 102 sends, to the client computing device 104, a response to the DNS request that was sent from the client computing device 104. The DNS service 102 includes, in the response, the address to route to the intermediate service 110. The DNS service 102 also includes a nonce corresponding to the determined enterprise security policy as well as including, in the nonce, an indication of the protected service 106. In some examples, the DNS service 102 provides the nonce as part of an IPv6 (or other format) address. That is, the DNS service 102 may provide a routing part 202 of the IPv6 address with which data traffic from the client computing device 104 may be routed to the intermediate service 110. Additionally, the DNS service 102 may provide a nonce part 204 of the IPv6 address that may include the indication of the determined enterprise security policy as well as an indication of the protected service 106.

Figure 5:
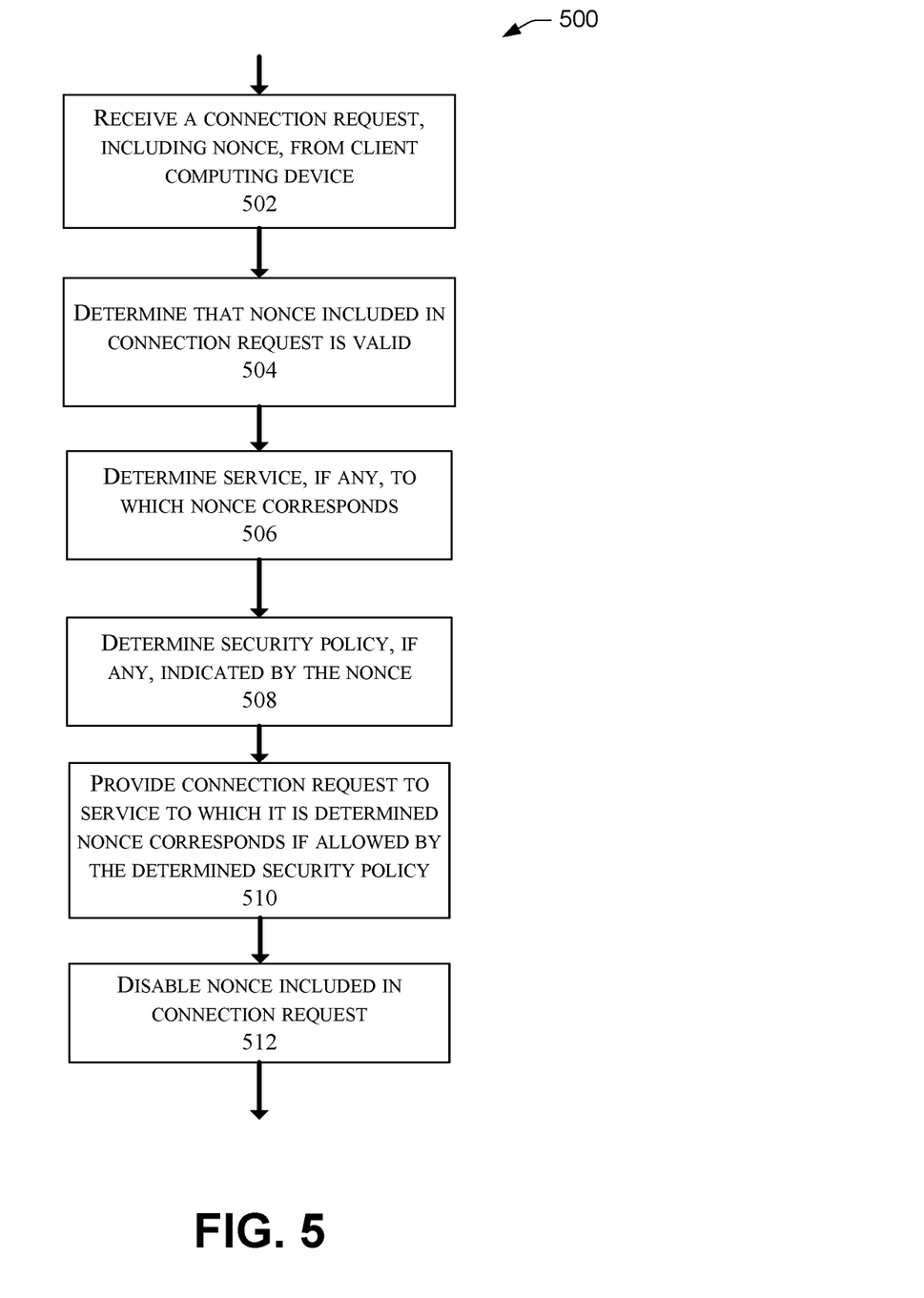
FIG. 5 is a flowchart illustrating an example process carried out by an intermediate service to process a connection request provided by the client computing device, the connection request including a nonce provided by a DNS service.

FIG. 5 is a flowchart illustrating an example process 500 carried out by the intermediate service 110 to process a connection request provided by the client computing device 104. At 502, the intermediate service 110 receives a connection request, including a nonce, from the client computing device 104. For example, the client computing device 104 may include the nonce as part of a destination IPv6 (or other format) address in the connection request. That is, the client computing device 104 may provide a routing part 202 of the IPv6 address with which data traffic from the client computing device 104 may be routed to the intermediate service 110. Additionally, the client computing device 104 may provide a nonce part 204 of the IPv6 address that includes the indication of the determined enterprise security policy as well as an indication of the protected service 106. The IPv6 address having the routing part 202 and the nonce part 204 may have been received by the client computing device 104 from the DNS service 102 in response to a DNS request from the client computing device 104.

At 504, the intermediate service 100 determines that the nonce included in the connection request from the client computing device 104 is valid. For example, the DNS service 102 may have provided the nonce to the intermediate service 110 at the time the DNS service 102 responded to a DNS request from the client computing device 104. Furthermore, intermediate service 110 may not have processed that same nonce previously. For example, the nonce may not be a nonce that the intermediate service 110 has tracked as being previously used. Yet still, the intermediate service 110 may determine that a time at which the connection request, including the nonce, is received from the client computing device, is within a time period associated with the intermediate service 110 receiving the nonce from the DNS request. On the other hand, if the intermediate service 110 does not determine that the nonce included in the connection request from the client computing device 104 is valid, the intermediate service may not proceed to operation 506 of the process 500, for the connection request received at operation 502 of the process 500.

At 506, the intermediate service 110 determines the service, if any, to which the nonce corresponds. More particularly, the intermediate service 110 determines that the nonce corresponds to the protected service 106. For example, the nonce may include an index into a table of protected services, and the intermediate service 110 indexes into the table with the included index to obtain, from the indexed entry in the table, a value for the indexed entry that is an indication of the protected service 106. The intermediate service may have populated the index entry with the indication of the protected service 106 based at least in part upon the notification of the nonce from the DNS service 102.

At 508, the intermediate service 110 determines the security policy, if any, indicated by the nonce. For example, the DNS service 102, upon generation of the nonce, may have informed the intermediate service 110 of the nonce along with at least one security policy to apply to a connection request that includes the nonce. The intermediate service 110 may have stored an indication of the at least one security policy in a manner that the indication of the at least one security policy could be determined upon receipt of the connection request including the nonce. As another example, the intermediate service 110 may implicitly apply one or more security policies to the connection request even if a security policy is not explicitly indicated by or otherwise corresponds to the nonce.

At 510, the intermediate service 110 provides the connection request to the service to which the intermediate service 110 has determined the nonce corresponds (the protected service 106, since the connection request is allowed to be provided consistent with the security policy. At 512, the intermediate service 110 disables the nonce included in the connection request, so that the nonce cannot be subsequently reused. This will, for example, prevent an eavesdropper of the connection request from the client computing device 104 from accessing the protected service 106 by reusing the nonce included in the connection request from the client computing device. For example, the intermediate service 110 may track the nonce as having been used in a manner that the intermediate service 110 can determine, when processing a subsequent connection including the same nonce, that the subsequent connection request is invalid.

Figure 6:
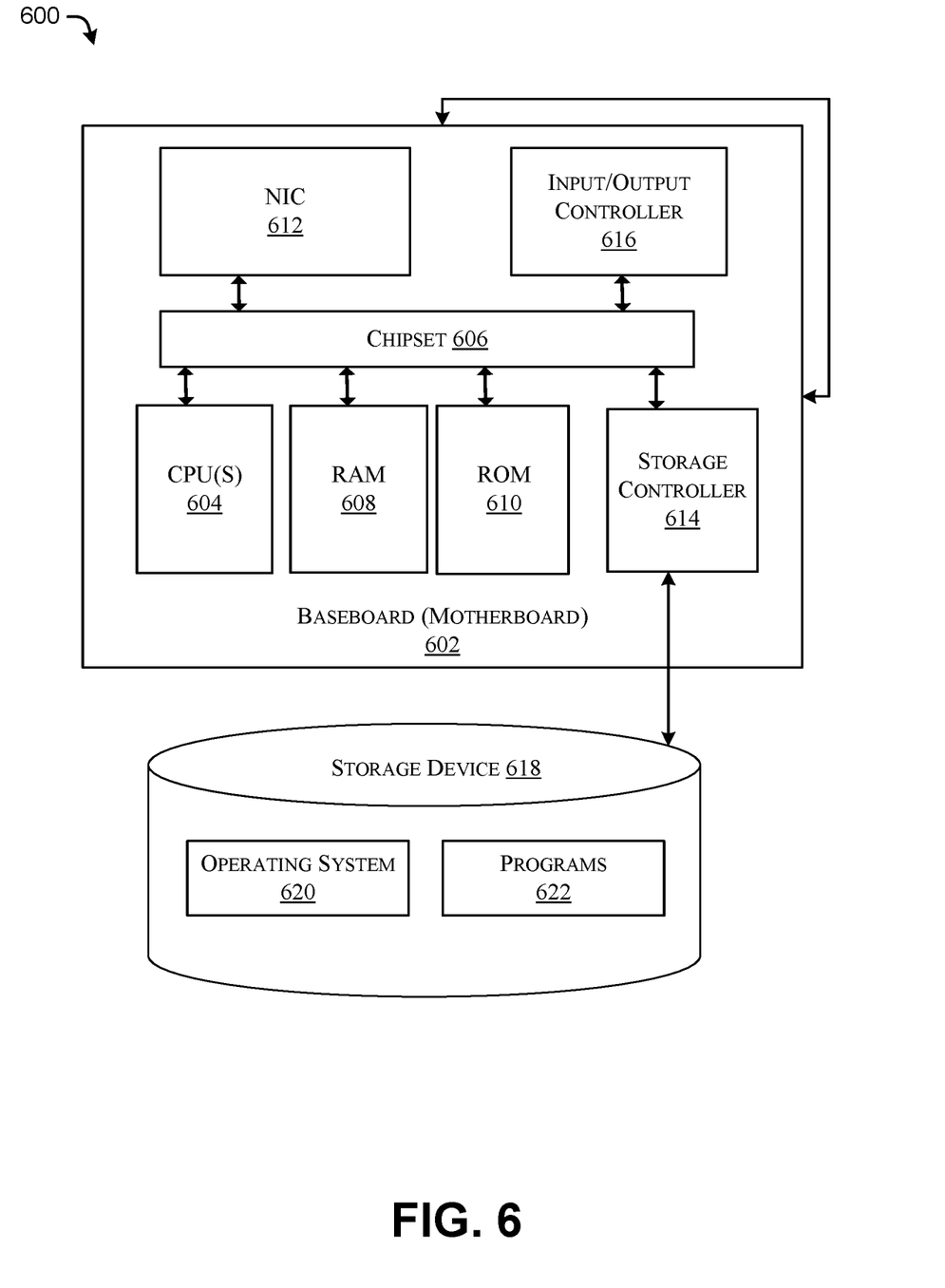
FIG. 6 illustrates an example computer architecture for a computer capable of executing program components for implementing the functionality described herein.

FIG. 6 illustrates an example computer architecture for a computer 600 capable of executing program components for implementing the functionality described above. The computer architecture shown in FIG. 6 illustrates an architecture of a server computer, workstation, desktop computer, laptop, tablet, network appliance, e-reader, smartphone, network switch, or other computing device, and can be utilized to execute any of the software components presented herein. The computer 600 may, in some examples, correspond to a network infrastructure device discussed herein.

The computer 600 includes a baseboard 602, or "motherboard," which may be a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be, for example, standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein. As illustrated in FIG. 6, the ROM 610 or NVRAM can also store data usable by the computer 600 to generate and/or process attestation information in messages exchanged among the computer 600 and other devices. In other examples, this data may be stored elsewhere, such as in RAM 608.

The computer 600 can operate in a networked environment using logical connections to remote computing devices and computer systems through a network. For example, the chipset 606 can include functionality for providing network connectivity through a Network Interface Controller (NIC) 612, such as a gigabit Ethernet adapter. The NIC 612 can connect the computer 600 to other computing devices over a network. It should be appreciated that multiple NICs 612 can be present in the computer 600, connecting the computer to other types of networks and remote computer systems. In some instances, the NICs 612 may include at least one ingress port and/or at least one egress port. An input/output controller 616 may be provided for other types of input/output.

The computer 600 can be connected to a storage device 618 that provides non-volatile storage for the computer. The storage device 618 can store an operating system 620, programs 622, and data 624, for example. The storage device 618 can be connected to the computer 600 through a storage controller 614 connected to the chipset 606. The storage device 618 can include one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The data 624 may include, for example, a table of protected services, where the intermediate service 110 may index into the table with an index included in a nonce to obtain, from the indexed entry in the table, an indication of a protected service to which the intermediate service 110 is to forward traffic over a connection from a client computing device that provided the nonce. The intermediate service 110 may have populated the index entry with the indications of the various protected services based at least in part upon notification of nonces from the DNS service 102. The data 624 may also or instead include a list of nonces that have been previously used so that, for example, the intermediate service 110 can reject a connection request that includes a nonce that is indicated by the data 624 as having been previously used.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like. For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the storage device 618 described above, the computer 600 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 600.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method performed at least partly by a domain name service (DNS), comprising:
  by the DNS, receiving a name resolution request from a client computing device, the name resolution request being associated with a destination;

determining, using a routing policy, that traffic from the client device sent to the destination is to be processed by a service;

generating a nonce that is associated with the service; and by the DNS, providing nonce to the client computing device such that the traffic sent from the client device using the nonce is routed to the service, wherein the service is configured to authorize a connection request from the client computing device based at least in part on processing the nonce.

2. The method of claim 1, wherein the service is an intermediate service that is configured to authorize the connection request from the client computing device to the destination service based at least in part on processing the nonce.

3. The method of claim 2, wherein the intermediate service is configured to perform a network security function.

4. The method of claim 1, wherein the service is one of a virtual private cloud (VPC) ingress point or a load balancer.

5. The method of claim 1, wherein the service is a destination service that is configured to authorize the connection request from the client computing device to the destination service based at least in part on processing the nonce.

6. The method of claim 1, further comprising:

by the DNS, determining at least a first enterprise security policy associated with a combination of the client computing device and the connection request; and based at least in part on receiving the name resolution request, providing a response to the client computing device, the response including a routing part and a nonce part, the nonce part corresponding to the at least the first enterprise security policy.

7. The method of claim 6, wherein determining the at least the first enterprise security policy includes interacting with an enterprise policy service.

8. The method of claim 6, wherein the name resolution request is a first name resolution request, the service is a first protected service, and the routing part is a first routing part that indicates an intermediate service that is intermediate to the first protected service from the client computing device, the method further comprising:

by the domain name service, receiving a second name resolution request from the client computing device, the second name resolution request including a name of a second protected service;

by the DNS, determining at least a second enterprise security policy associated with a combination of the client computing device and the second protected service; and based at least in part on receiving the second name resolution request, providing a response to the client computing device for accessing the second protected service, the response including a second routing part and a second nonce part, the second nonce part corresponding to the at least the second enterprise security policy and the second routing part corresponding to the second protected service.

9. The method of claim 1, wherein:

by the DNS, providing the nonce to the client computing device includes providing the nonce to the client as a part of an IPv6 address.

10. A method of validating a connection request from a client computing device, comprising operations of:

receiving, at an intermediate service, the connection request for the client computing device to connect to a destination, the connection request including a nonce address associated with the intermediate service;

determining that the connection request is permitted;

based at least in part on determining that the connection request is permitted, authorizing the connection request;

forwarding the connection request to the destination; and disabling the nonce.

11. The method of claim 10, further comprising:

by the intermediate service, applying a security policy to the connection request based at least in part on the nonce address.

12. The method of claim 10, wherein:

the intermediate service is at least one of a virtual private cloud (VPC) ingress point or a load balancer.

13. The method of claim 10, wherein:

the determining operation and the authorizing operation are performed by the destination.

14. The method of claim 10, wherein:

the connection request includes a destination IPv6 address, the destination IPv6 address including a routing part and a nonce part, the nonce part containing the nonce address.

15. A domain name service (DNS), comprising:

one or more processors; and one or more non-transitory computer-readable media storing computer-executable instructions that, when executed by the one or more processors, cause the one or more processors to perform operations of;

receiving a name resolution request from a client computing device, the name resolution request being associated with a destination;

determining, using a routing policy, that traffic from the client device sent to the destination is to be processed by a service;

generating a nonce that is associated with the service; and providing nonce to the client computing device such that the traffic sent from the client device using the nonce is routed to the service, wherein the service is configured to authorize a connection request from the client computing device based at least in part on processing the nonce.

16. The DNS of claim 15, the operations further comprising:

determining at least a first enterprise security policy associated with a combination of the client computing device and the connection request; and based at least in part on receiving the name resolution request, providing a response to the client computing device, the response including a routing part and a nonce part, the nonce part corresponding to the at least the first enterprise security policy.

17. The DNS of claim 16, wherein the operation of determining the at least the first enterprise security policy includes interacting with an enterprise policy service.

18. The DNS of claim 16, wherein the name resolution request is a first name resolution request, the service is a first protected service, and the routing part is a first routing part that indicates an intermediate service that is intermediate to the first protected service from the client computing device, the operations further comprising:

receiving a second name resolution request from the client computing device, the second name resolution request including a name of a second protected service;

determining at least a second enterprise security policy associated with a combination of the client computing device and the second protected service; and based at least in part on receiving the second name resolution request, providing a response to the client computing device for accessing the second protected service, the response including a second routing part and a second nonce part, the second nonce part corresponding to the at least the second enterprise security policy and the second routing part corresponding to the second protected service.

19. The DNS of claim 15, wherein:
providing the nonce to the client computing device includes providing the nonce to the client computing device as a part of an IPv6 address.

\* \* \* \* \*